March 27, 1934.  F. RUFFERTSHOFER  1,952,944
ANTISKID DEVICE
Filed Dec. 27, 1932
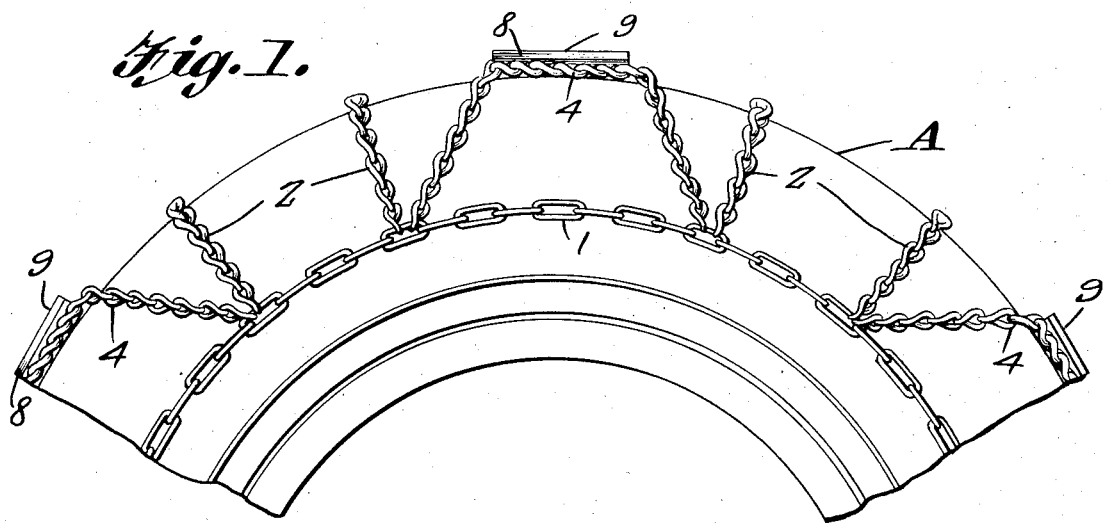
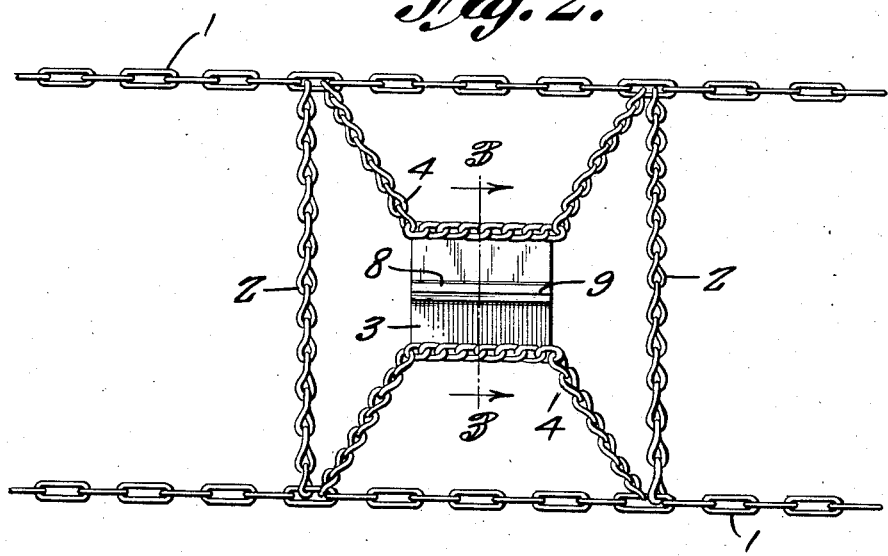
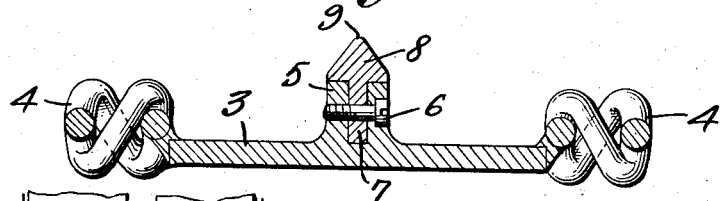
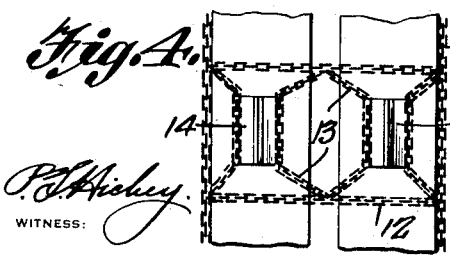
Fred Ruffertshofer, INVENTOR
BY Victor J. Evans & Co.
ATTORNEY Patented Mar. 27, 1934

1,952,944

UNITED STATES PATENT OFFICE 1,952,944

ANTISKID DEVICE

Fred Ruffertshofer, Auburn, Mich.

Application December 27, 1932, Serial No. 649,016

1 Claim. (Cl. 152—14)

This invention relates to anti-skid devices for vehicle wheels, and its general object is to provide an anti-skid device that increases the traction qualities of the wheels to enable the vehicle to travel in safety on icy and slippery streets, roads and the like.

Another object of the invention is to provide an anti-skid device that can be applied to the usual non-skid chains now in general use and includes means to practically eliminate side sliding or slippage.

A further object of the invention is to provide an anti-skid device that includes a penetrating means that is detachable, so that it can be readily replaced when damaged or worn.

A still further object of the invention is to provide an anti-skid device that is simple in construction, inexpensive to manufacture and extremely efficient in operation and service.

This invention also consists in certain other features of construction and in the combination and arrangement of the several parts, to be hereinafter fully described, illustrated in the accompanying drawing and specifically pointed ont in the appended claim.

In describing my invention in detail, reference will be had to the accompanying drawing wherein like characters denote like or corresponding parts throughout the several views, and in which:—

Figure 1 is a side view illustrating the application of my device to a vehicle wheel.

Figure 2 is a fragmentary top plan view.

Figure 3 is a sectional view taken approximately on line 3—3 of Figure 2.

Figure 4 is a fragmentary view illustrating a slightly modified form of my device for use with dual wheels.

Referring to the drawing in detail, the letter A indicates the tire of a vehicle wheel and while I have illustrated my non-skid device as including a chain of a special construction, the device can be applied to non-skid chains now in general use.

In the form as shown in Figures 1 to 3 inclusive, I employ a pair of side chains 1, which have connected to the links thereof cross chains 2 arranged in pairs with the cross chain of each pair disposed a considerable distance apart while the cross chains of one pair is arranged at close proximity with the cross chains of adjacent pairs.

Each of the anti-skid devices consists of a plate 3 that is preferably rectangular and substantially flat, and welded or otherwise secured to the longitudinal edges of the plate 3 are the intermediate portions of chains 4. The free portions of the chains 4 are directed outwardly in diverging relation from the point of connection with the end links of the secured portions of the chains 4 and the outer ends of the free portions are fixed to the links of the side chains that receive the end links of the cross chains of a pair as will be noted upon inspection of Figure 2, with the result the plate is secured between the cross chains of a pair.

Arranged longitudinally of the center of the plate 3 is a rib 5 which is provided with a longitudinally arranged groove and the rib 5 is provided with bores disposed transversely therethrough for the purpose of receiving screw bolts 6 which pass through the shank 7 of a calk 8 which together with its shank 7 is a length coextensive with the length of the rib 5 and the head is substantially triangular shape in cross section as will be noted upon inspection of Figure 3, so as to provide beveled outer faces terminating in a ground penetrating edge 9.

By that construction, it will be obvious that the calk can be readily removed if it becomes damaged or worn and replaced by a new one, and due to the arrangement of the calk and the cooperation of the fixed portions of the chain 4, it will be apparent that lateral sliding or slippage of a wheel equipped with my device is practically impossible, and the device adds materially to the traction qualities of the wheel so as to insure safe travel on icy and slippery roadways.

In Figure 4 I have illustrated a slightly modified form of my invention for use with dual wheels and in that form I also employ side chains 11, and cross chains 12, but the latter are of a length to reach across both tires of the dual wheel and have their ends secured to the side chains 11, while the chains 13 which are secured to the confronting edges of the plates 14 have their ends connected to the cross chains midway the ends of the latter as shown. The structure in the modified form is otherwise similar to the form as shown in Figures 1, 2 and 3.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

An anti-skid device comprising side chains, cross chains connected to the side chains in pairs, anti-skid means including plates, chains having intermediate portions welded to the longitudinal opposed edges of the plates, each of the last mentioned chains extending from the ends of the side edges of the plates in diverging relation and connecting the latter centrally of the side chains and the chains of each pair of the cross chains,

FRED RUFFERTSHOFER.